United States Patent [19]

Woodhouse

[11] Patent Number: 4,721,330
[45] Date of Patent: Jan. 26, 1988

[54] PIPE CLAMP DEVICE

[75] Inventor: Ian Woodhouse, Burton-on-Trent, England

[73] Assignee: Silvertown House, London, England

[21] Appl. No.: 798,854

[22] Filed: Nov. 18, 1985

[30] Foreign Application Priority Data

Nov. 21, 1984 [GB] United Kingdom ............... 8429364

[51] Int. Cl.$^4$ ............................................. F16L 21/06
[52] U.S. Cl. ................................... 285/177; 285/337
[58] Field of Search .............. 285/337, 368, 413, 415, 285/178, 319, 383, 286, 53, 175, 319, 411, 177

[56] References Cited

U.S. PATENT DOCUMENTS

| | | | |
|---|---|---|---|
| 347,461 | 8/1886 | Bourgerel | 285/411 |
| 940,098 | 11/1909 | Wehrle | 285/337 |
| 1,051,056 | 1/1913 | Clark | 285/383 |
| 1,309,145 | 7/1919 | Mann | 285/337 |
| 1,568,268 | 1/1926 | Clark et al. | 285/337 |
| 1,671,789 | 5/1928 | Smith | 285/383 |
| 1,877,094 | 9/1932 | Walborn | 285/383 |
| 2,269,695 | 1/1942 | Scharf | 285/53 |
| 2,328,168 | 8/1943 | Risley | 285/337 |
| 2,415,753 | 2/1947 | Newell | 285/119 |
| 2,438,234 | 3/1948 | Stewart | 285/337 |
| 2,822,195 | 2/1958 | Hoke | 285/337 |
| 2,923,561 | 2/1960 | Merrill | 285/413 |
| 2,992,022 | 7/1961 | Risley et al. | 285/337 |
| 3,415,543 | 12/1968 | Yano | 285/337 |
| 3,469,852 | 9/1969 | Smith et al. | 285/337 |
| 3,471,175 | 10/1969 | Newton | 285/175 |
| 3,547,471 | 12/1970 | Dunmiere | 285/337 |
| 3,782,683 | 1/1974 | Lee et al. | 285/337 |
| 3,910,610 | 10/1975 | Turner et al. | 285/337 |
| 4,119,335 | 10/1978 | Rieffle et al. | 285/337 |
| 4,471,979 | 9/1984 | Gibb et al. | 285/411 |
| 4,522,434 | 6/1985 | Webb | 285/368 |
| 4,568,112 | 2/1986 | Bradley, Jr. et al. | 285/368 |
| 4,601,495 | 7/1986 | Webb | 285/368 |
| 4,639,020 | 1/1987 | Rung et al. | 285/411 |

FOREIGN PATENT DOCUMENTS

| | | | |
|---|---|---|---|
| 674247 | 6/1966 | Belgium | 285/337 |
| 633236 | 12/1949 | United Kingdom . | |
| 0831294 | 3/1960 | United Kingdom | 285/337 |
| 2016626 | 9/1979 | United Kingdom | 285/337 |

Primary Examiner—Randolph A. Reese
Assistant Examiner—Anthony Knight
Attorney, Agent, or Firm—Holman & Stern

[57] ABSTRACT

A pipe clamp device for the compression of a gasket relative to a pipe joint comprises a clamping ring having interconnectable portions with a peripheral gasket-engaging surface and adapted for disposition around a pipe, connecting devices to connect the ring to an anchor ring to apply a generally axial clamping force to the clamping ring and thereby to the gasket, compression devices operable to cause radially inward contraction of the ring portions and consequent radial compression of the sealing gasket, and a varying diameter inner peripheral surface on the anchor ring to allow use on pipes of various diameters.

11 Claims, 7 Drawing Figures

1

PIPE CLAMP DEVICE

BACKGROUND OF THE INVENTION

1. Field of the Invention

This invention relates to a pipe clamp device, primarily for use with socket and spigot pipe joints which the socket may be formed in one of two pipes to be joined or in a separate socket member used to interconnect a pair of pipes of uniform diameter, or to receive a single pipe, the device being operable to compress an external sealing ring, often for the purpose of repairing a leaking joint.

2. Description of the Prior Art

Underground pipes for the transport of liquids and gases are usually in the form of a succession of pipe sections joined together longitudinally by spigot and socket joints which normally incorporate a packing material between internal opposing surfaces of the joint for sealing purposes. While such joints can remain leak-free for a number of years, the effects of ground movement and vibration and/or degradation of the packing can result in eventual leakage of the joint, with possibly disastrous consequences, particularly in the case of gas pipes.

It has become common practice to repair leaking joints of the aforesaid kind by the application of a resilient sealing gasket against adjacent external surfaces of the joint, such ring being compressed generally axially against said surfaces by a clamping device to seal off the leak. An example of such a clamping device used with a spigot and socket joint formed by a pair of pipe end portions is shown in U.S. Pat. No. 2,822,195 and consists of an anchor ring which engages behind a shoulder of the socket and a clamp ring for engagement with a gasket placed around the spigot-bearing pipe and against the free end of the socket. Clamping bolts extending between the two rings may be tightened to draw the rings towards one another and produce a generally axially directed sealing force on the gasket. It has been found, in practice, however that this type of arrangement can often deform the gasket in such a manner that its sealing action is not wholly effective or becomes insufficiently effective as a result of subsequent seal relaxation and/or deformation of the pipe joint parts.

BRIEF SUMMARY OF THE INVENTION

An object of the invention is to provide a pipe clamp device in which the aforesaid drawback is alleviated or avoided.

According to the invention, a pipe clamp device for the compression of a gasket relative to a pipe joint comprises a clamping ring including a plurality of interconnectable portions having a peripheral gasket-engaging surface and adapted for disposition around a pipe, connecting means adapted to connect the clamping ring to an anchoring location and to apply a generally axial clamping force to the ring and thereby to the gasket, the clamping ring being provided with compression means acting between the clamping ring portions in a direction substantially parallel to a tangential direction such that operation of said compression means causes radially inward contraction of the ring portions and consequent radial compression of the sealing gasket.

In one convenient form of the device adapted for use with a joint forming part of an assembly including a pair of pipes, the clamping ring is disposed, in use, around one of the pipes, and an anchor device is provided for disposition around the other pipe adjacent the joint, the connecting means acting between the clamping ring and anchor device to apply said clamping force.

The anchor device may conveniently be in the form of a sleeve into the opposite ends of which the pipes are respectively inserted, each pipe carrying a compressible gasket for engagement with the sleeve and the sleeve having anchoring means, conveniently in the form of a radial flange or projection, for co-operation with said connecting means in order to apply said axial clamping force to the gasket.

In an alternative form of the device for use with a socket and spigot pipe joint, an anchor device is provided in the form of a ring including a plurality of interconnectable portions adapted for disposition around the socket-carrying pipe at the side of the socket remote from the clamping ring disposed around the spigot-carrying pipe.

Conveniently, the clamping ring includes a plurality of interconnectable parts, preferably comprising two initially separate parts, one end portion of each part providing a formation for the reception of a respective other end portion of another part to complete the ring. Preferably, each said other end portion has a formation to receive said compression means such as a bolt therethrough, each bolt extending into cooperative relationship with the formation of the other ring part such as to enable said compression means to exert a radially inward force acting to contract said ring portions.

BRIEF DESCRIPTION OF THE DRAWINGS

The invention will now be described, by way of example with reference to the accompanying drawings wherein.

DETAILED DESCRIPTION

Figure 1:
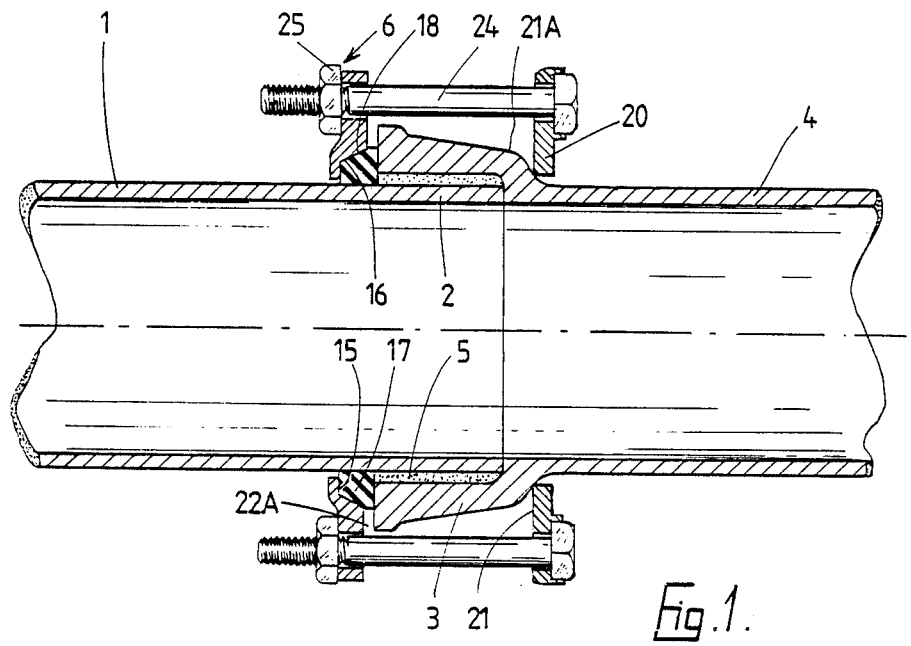
FIG. 1 is a longitudinal cross-sectional view of one form of the pipe joint of the invention.

The drawings illustrate a socket and spigot pipe joint in which a first pipe 1 provides a spigot 2 inserted within a socket 3 provided at the end of a second pipe 4. A packing 5 is inserted between the opposed interengaged surfaces of the spigot 2 and socket 3 for the purpose of sealing the joint. Such a spigot and socket joint is widely found in underground pipework systems, for the transmission of gas for example, and the invention is concerned with the repair of the joint by external means when leakage of gas occurs past the gasket 5, as can often occur due to degradation of the packing or loosening thereof as a result of vibrations and/or ground movements, after extended use.

Figure 2:
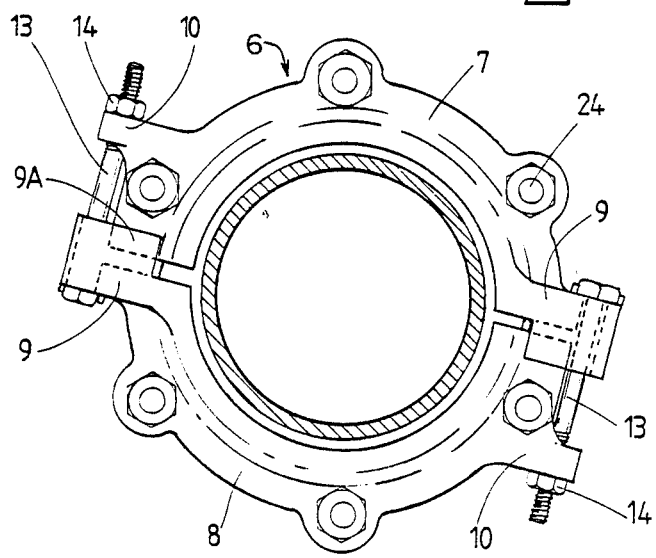
FIG. 2 is an end view of the joint from the left of FIG. 1.
Figure 3:
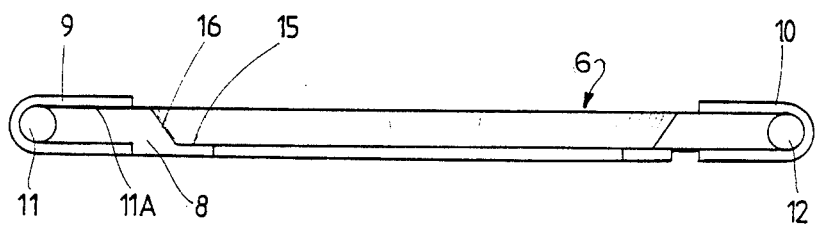
FIG. 3 is a side elevational view of the normally inner edge of one part of the clamping ring of FIGS. 1 and 2.

The invention envisages repair of such a joint by the use of a pipe clamp device, as will be described hereinafter. The pipe clamp device of the invention comprises a clamping ring indicated generally at 6 and includes a pair of last half rings 7 and 8, the internal diameter of the complete ring being similar to the external diameter of the pipe 1. Each half ring 7, 8 includes generally U-shaped integral lugs 9 and 10 adjacent its respective ends. As will be more clearly seen from FIGS. 2 and 3, the lug 9 is arranged so that a closed recess 11 is defined between the base of the U and an adjacent edge surface of the half ring 8. A part 9A of the lug projects generally circumferentially beyond the adjacent end of the ring half 8 to define a recess 11A within which is received the adjacent end portion of the other ring half 7. The other U-shaped lug 10 is positioned to provide a closed recess 12 between the base of the lug and the adjacent ring edge such that, when the ring halves 7, 8 are assembled around the pipe 2, as illustrated in FIGS. 1 and 2, the recesses 11 and 12 of lugs 9 and 10 on one half ring are aligned respectively with recesses 12 and 11 on the other half ring to permit the passage therethrough of bolts 13 which co-operate with nuts 14.

Each half ring is provided with a gasket seat having a substantially flat seat portion 15 around its internal periphery and an adjacent chamfered seat portion 16. This gasket seat bears, in use, against a sealing gasket 17 of rubber or like material disposed around the pipe 1 and placed against the free end of the socket 3. The gasket 17 has a chamfer 18 which bears against the chamfered seat portion 16 of the ring.

Figure 4:
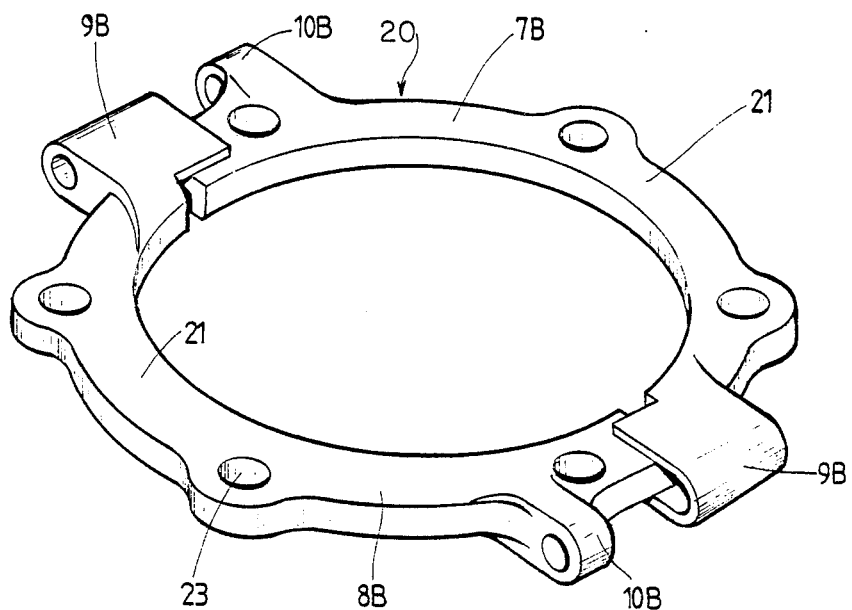
FIG. 4 is a perspective view of one form of anchor ring used in the device of FIGS. 1 and 2.

The clamp device of the invention also includes an anchor ring 20, one form of which is illustrated in FIG. 4, from which it will be seen that the anchor ring 20 is generally similar to the clamping ring 6, except that the surfaces 15 and 16 are omitted. The anchor ring is composed of two cast ring halves 7B, 8B carrying an arrangement of integral lugs 9B, 10B similar to those on the clamping ring 6.

In order to use the clamping device of the invention for the purpose of sealing a leaking pipe joint of the kind described, the half rings of the respective rings 6 and 20 are placed around the pipes 1 and 4 with an end of each ring half housed in a socket 11A of the other ring half, as described above, the rings being completed by the insertion of the bolts 13 through the lugs 9, 9B and 10, 10B of the rings and the nuts 14 being screwed along the bolts to engage the adjacent lugs, but not tightened. The rings are then positioned so that the surface 21 of the anchor ring 20 lies against a shoulder 21A formed at the rear of the socket 3 and the surface portions 15 and 16 of the clamping ring 6 are positioned to sandwich the gasket 17 between those surface portions and the free end 22A of the socket 3. Both of the rings 6 and 20 are provided with a number of holes 23 around their outer peripheries for the reception of axial clamping bolts 24 which are passed through opposed pairs of holes respectively in the two rings and tightened by means of nuts 25 to provide an axial clamping force urging the rings firmly into engagement with the shoulder 21A and gasket 17. When sufficient axial force has been produced, the nuts 14 of the clamping ring 6 are tightened to cause a radially inward contraction of this ring in order to compress the gasket 17 radially to the desired extent. The ring 20 may then be contracted by tightening the bolts 13 thereof, in order to bring the bolts 24 to positions in which they are generally mutually parallel, as shown.

Figure 5:
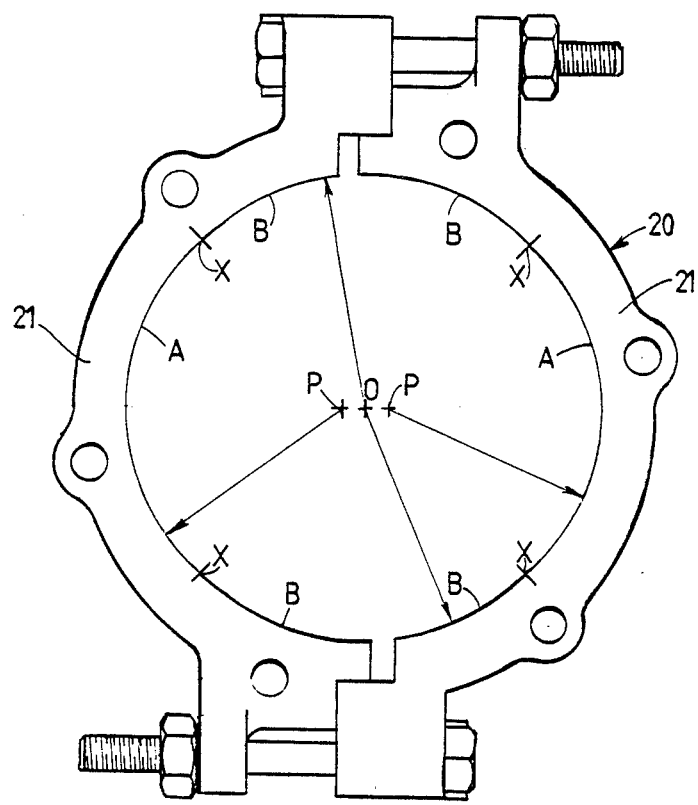
FIG. 5 is a fragmentary end view of a modified form of anchor ring.

FIG. 5 illustrates part of an alternative form of anchor ring 20 of which the internal surfaces of the half rings 21 are modified for greater adaptability of use. The internal periphery of each half ring has a central surface A, delimited between points X, of which the radius of curvature is centered at one of two points P. The remaining surfaces B of the rings outside the points X have a larger radius of curvature, being centered at 0. The result of this arrangement is that, with the rings assembled as shown, the opposed surfaces A form a first part-circular inner peripheral surface which is of smaller diameter than a second part-circular inner peripheral surface formed by the surfaces B. This provides the pipe clamp with increased flexibility of use, enabling it to adapt to a wider range of pipe diameters than would be the case with a single diameter anchor ring. Thus, clamping will take place on one or other of the first and second surfaces according to the diameter of pipe employed.

Figure 6:
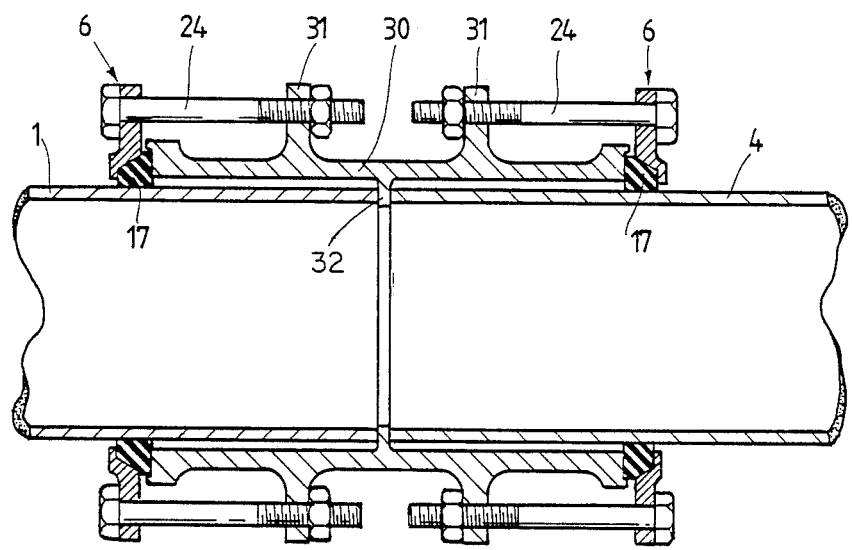
FIGS. 6 and 7 illustrate respectively different alternative embodiments of the clamping device of the invention.

FIG. 6 shows an alternative embodiment of the clamping device of the invention useful for enhancing the sealing of a joint between two plain pipes 1 and 4 of equal diameter. The clamping device is in the form of a sleeve 30 having an internal shoulder 32 against which the ends of the pipes are located within the sleeve. A gasket 17 is provided at each end of the sleeve and a clamping ring 6, similar to that used in the previous embodiments, is provided at each end of the sleeve in association with the respective gaskets 17. The gaskets may be received within axial peripheral recesses formed in the sleeve end surfaces. In this embodiment, two anchor devices are provided in the form of radial flanges 31 of the sleeve 30, clamping bolts 24 acting between these flanges and the clamping rings 6 in order to apply axial compression to the gaskets 17. Radial compression of the gaskets is effected by the clamping rings 6 in the manner described previously. The sleeve 30 may be split diametrically to permit it to be fitted around an existing pipe assembly in order to effect a repair for example, or may alternatively be in one piece for use on new pipe installations.

In a modified form of the arrangement shown in Figure 6, the sleeve 30 could have two co-axial portions of different diameters to receive different diameter pipes and in this embodiment the clamping rings would have correspondingly differing diameters. It would be possible to use only a single flange 31 and a threaded device such as a nut may be then employed to receive the ends of the clamping screws. The shoulder 32 within the sleeve may be omitted if desired.

Figure 7:
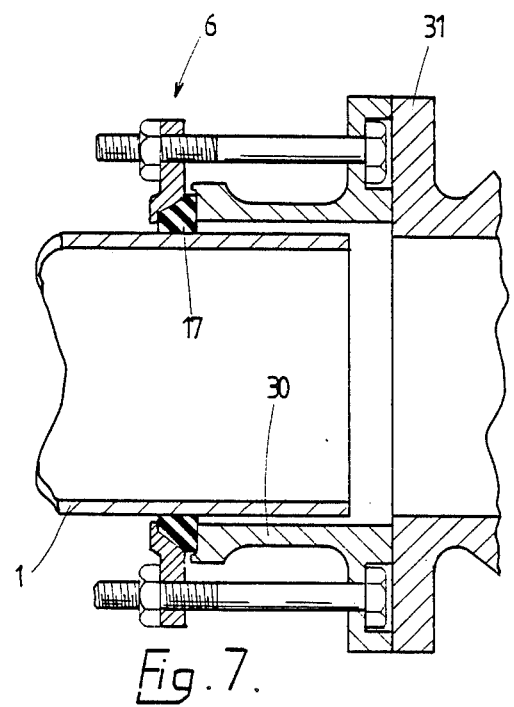

In the alternative embodiment illustrated in FIG. 7, a single pipe 1 is received within a sleeve 30 and a clamping ring 6 is employed to effect axial and radial compression of a gasket 17 between the end of the sleeve 30 and outer surface of the pipe 1 in the manner described previously. The sleeve 30 is connected by suitable conventional means to a device such as a valve 31, enabling the pipe 1 to be connected to such a valve in a simple and effective manner.

It has been found that the combination of axial and radial compressive forces applied to the gasket 17 provides a greater reliability of sealing action than has been produced by conventional clamp devices. It will be understood that the device of the invention may vary from the precise forms described. For example, the bolts 13 may be replaced by cam arrangements or other suitable means for effecting radial contraction of the ring halves. The preferred form of sealing gasket 17 is illustrated but other shapes may be used, the shape of the ring seating surface being modified as required. Moreover, the clamping rings and anchoring devices may be made from a variety of different materials and by different manufacturing methods, the preferred procedure in practice being casting from SG iron. The possibility of splitting the clamping ring and anchoring ring or sleeve is advantageous in enabling the clamping device to be used for effecting repair of existing pipe installations.

I claim:

1. In a pipe clamp device for the compression of a sealing gasket relative to a socket and spigot joint forming part of an assembly including a socket-carrying pipe and a spigot-carrying pipe, a shoulder being provided on the socket-carrying pipe, a clamping ring comprised of a plurality of interconnectable portions each having a peripheral gasket-engaging surface adapted for disposition around the spigot-carrying pipe, said gasket engaging surfaces forming a substantially continuous gasket engaging surface when assembled, compression means operatively connecting said portions and acting between said portions in a direction substantially parallel to a tangential direction such that compressing operation of said compression means causes radially inward contraction of said portions and consequential radial compression of the gasket, an annular anchor device provided for disposition around the socket-carrying pipe adjacent the joint and having an internal peripheral surface engageable with a shoulder on the socket-carrying pipe, and connecting means adapted to connect the clamping ring to the anchor device for applying a generally axial clamping force between the clamping ring and anchor device and thereby to the gasket, the improvement wherein:

the internal peripheral surface of the anchor device comprises two pairs of curved surfaces, said curved surfaces in each pair being diametrically opposed to one another when the anchor device is disposed around the socket-carrying pipe, each curved surface extending for only a part of said internal peripheral surface, the internal radius of one pair of said curved surfaces being different from the internal radius of the other pair of said curved surfaces for enabling one of said pairs of said curved surfaces to match a shoulder on a different outer diameter socket-carrying pipe, around which the anchor device is disposed, than the other pair of said curved surfaces.

2. A pipe clamp device as claimed in claim 1 wherein said anchor device is provided in the form of a ring comprising:

a plurality of interconnectable portions adapted for disposition around the socket-carrying pipe and in engagement with said shoulder at the side of the socket remote from the clamping ring disposed around the spigot-carrying pipe.

3. A pipe clamp device as claimed in claim 2 wherein:

one surface of one of said two pairs of said curved surfaces is disposed on one interconnectable portion of the anchor device; and the other surface of said one of said two pairs of said curved surfaces is disposed on another interconnectable portion of the anchor device.

4. A pipe clamp device as claimed in claim 1 wherein the clamping ring comprises:

two separate clamping parts; and one end portion of each clamping part has a substantially hollow form for receiving the other end portion of the other clamping part, so that when said two clamping parts are assembled a complete ring is formed.

5. A pipe clamp device as claimed in claim 2 wherein the clamping ring comprises:

two separate clamping parts; and one end portion of each clamping part has a substantially hollow form for receiving the other end portion of the other clamping part, so that when said two clamping parts are assembled a complete ring is formed.

6. A pipe clamp device as claimed in claim 3 wherein the clamping ring comprises:

two separate clamping parts; and one end portion of each clamping part has a substantially hollow form for receiving the other end portion of the other clamping part, so that when said two clamping parts are assembled a complete ring is formed.

7. A pipe clamp device as claimed in claim 4 wherein said compression means comprises:

bolt holes extending through said end portions of said clamping parts, said bolt holes being in alignment when said clamping parts are assembled; and bolt means extending through the aligned holes for producing when tightened a radially inward force on said clamping parts and said consequential radial compression of said gasket.

8. A pipe clamp device as claimed in claim 5 wherein said compression means comprises:

bolt holes extending through said end portions of said clamping parts, said bolt holes being in alignment when said clamping parts are assembled; and bolt means extending through the aligned holes for producing when tightened a radially inward force on said clamping parts and said consequential radial compression of said gasket.

9. A pipe clamp device as claimed in claim 6 wherein said compression means comprises:

bolt holes extending through said end portions of said clamping parts, said bolt holes being in alignment when said clamping parts are assembled; and bolt means extending through the aligned holes for producing when tightened a radially inward force on said clamping parts and said consequential radial compression of said gasket.

10. A pipe clamp device device as claimed in claim 1 wherein:

one surface of one of said pairs of said curved surfaces has a center offset from the center of the other surface of said pair of said curved surfaces.

11. A pipe clamp device as claimed in claim 9 wherein:

one surface of one of said pairs of said curved surfaces has a center offset from the center of the other surface of said pair of said curved surfaces.

* * * * *

UNITED STATES PATENT AND TRADEMARK OFFICE
CERTIFICATE OF CORRECTION

PATENT NO. : 4,721,330
DATED : January 26, 1988
INVENTOR(S) : IAN WOODHOUSE

It is certified that error appears in the above-identified patent and that said Letters Patent is hereby corrected as shown below:

On the Title Page:

The Assignee appears incorrectly on the issued patent. The Assignee should be:

[73] Assignee: B T R, plc., London England

Signed and Sealed this

Twelfth Day of July, 1988

*Attest:*

DONALD J. QUIGG

*Attesting Officer*  *Commissioner of Patents and Trademarks*